US011619817B1

(12) United States Patent
Gollier et al.

(10) Patent No.: US 11,619,817 B1
(45) Date of Patent: *Apr. 4, 2023

(54) PANCAKE LENSES USING FRESNEL SURFACES

(71) Applicant: Meta Platforms Technologies, LLC, Menlo Park, CA (US)

(72) Inventors: Jacques Gollier, Sammamish, WA (US); Ying Geng, Bellevue, WA (US); Brian Wheelwright, Sammamish, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/101,211

(22) Filed: Nov. 23, 2020

Related U.S. Application Data

(63) Continuation of application No. 15/993,316, filed on May 30, 2018, now Pat. No. 10,845,597.

(60) Provisional application No. 62/590,985, filed on Nov. 27, 2017.

(51) Int. Cl.
*G02B 27/01* (2006.01)
*G02B 3/08* (2006.01)
*G02B 5/30* (2006.01)

(52) U.S. Cl.
CPC ........... *G02B 27/0172* (2013.01); *G02B 3/08* (2013.01); *G02B 5/3025* (2013.01); *G02B 5/3083* (2013.01); *G02B 2027/011* (2013.01); *G02B 2027/012* (2013.01)

(58) Field of Classification Search
CPC .... G02B 27/0172; G02B 3/08; G02B 5/3025; G02B 5/3083; G02B 2027/011; G02B 2027/012
USPC ........................................................ 359/742
See application file for complete search history.

(56) References Cited

U.S. PATENT DOCUMENTS

| | | | |
|---|---|---|---|
| 5,801,885 A | 9/1998 | Togino | |
| 5,853,240 A | 12/1998 | Tanaka et al. | |
| 5,973,760 A | 10/1999 | Dehmlow | |
| 6,072,632 A | 6/2000 | Ophey | |
| 6,476,944 B1 * | 11/2002 | La Russa | G02B 27/0103 359/15 |
| 6,563,638 B2 * | 5/2003 | King | G02B 27/283 359/485.05 |
| 6,710,928 B2 | 3/2004 | Roest | |
| 9,557,568 B1 | 1/2017 | Ouderkirk et al. | |
| 9,829,616 B2 | 11/2017 | Yun et al. | |
| 10,845,597 B1 * | 11/2020 | Collier | G02B 3/08 |
| 2001/0028332 A1 * | 10/2001 | Roest | G02B 27/0172 345/8 |

(Continued)

FOREIGN PATENT DOCUMENTS

WO WO-2019082039 A1 * 5/2019 ......... G02B 27/0172

*Primary Examiner* — George G. King
(74) *Attorney, Agent, or Firm* — Fenwick & West LLP

(57) ABSTRACT

A head-mounted display includes a pancake lens block. The pancake lens block includes a first waveplate to form first nonlinearly polarized light, a Fresnel surface to reflect and transmit a portion of the first nonlinearly polarized light, a second waveplate to form first linearly polarized light, and a linear reflective polarizer to transmit linear polarized light of a particular polarization rotation direction and to reflect light of other polarization rotation directions.

15 Claims, 10 Drawing Sheets

(56) References Cited

U.S. PATENT DOCUMENTS

| | | | |
|---|---|---|---|
| 2005/0111101 A1* | 5/2005 | Dike | G02B 27/28 |
| | | | 359/489.07 |
| 2005/0231828 A1 | 10/2005 | Bartone | |
| 2007/0070508 A1 | 3/2007 | Ruhle et al. | |
| 2010/0177113 A1 | 7/2010 | Gay et al. | |
| 2013/0242392 A1 | 9/2013 | Amirparviz et al. | |
| 2017/0068096 A1 | 3/2017 | Ouderkirk et al. | |

* cited by examiner

PANCAKE LENSES USING FRESNEL SURFACES

CROSS REFERENCE TO RELATED APPLICATIONS

This application is a continuation of co-pending U.S. application Ser. No. 15/993,316, filed May 30, 2018, which claims the benefit of U.S. Provisional Application No. 62/590,985, filed Nov. 27, 2017, each of which is incorporated by reference in its entirety.

BACKGROUND

The present disclosure generally relates to head-mounted displays, and specifically to head-mounted displays that include pancake lenses including one or more Fresnel surfaces.

Some conventional head-mounted displays (HMDs) include a pancake lens to vary a focal length of HMD's optics to enhance displayed images. Typical pancake lenses are made of two curved surface such that field aberrations of the two surfaces compensate each other. One type of the typical pancake lenses is made of a pair of concave mirrors with similar radii of curvatures. However, laminating a reflective polarizer and/or a quarter waveplate over one or more curved surfaces is hard to be mass-produced. The other type of the typical pancake lenses is made of a concave mirror and a flat mirror. In order to partly compensate for field aberrations introduced by the concave mirror, another converging lens is added to this type of pancake lens. However, this type of pancake lens requires a very thick converging lens to create effective aberration compensation for compact HMDs without decreasing field of views.

SUMMARY

A pancake lens block provides light from a display to an eye of a user. The pancake lens block includes a first quarter waveplate, a Fresnel surface, a second quarter waveplate, and a linear reflective polarizer. The first quarter waveplate changes a polarization of image light that is linearly polarized to nonlinearly polarized light, to form first nonlinearly polarized light. The Fresnel surface is coated with a partially reflective surface, and the Fresnel surface transmits a portion of the first nonlinearly polarized light. The second quarter waveplate changes a polarization of the first nonlinearly polarized light to linear polarized light, to form first linearly polarized light. The linear reflective polarizer transmits linear polarized light of a particular orientation and to reflect light of other orientations, and the first linearly polarized light has an orientation that is orthogonal to the particular orientation. The first linearly polarized light is reflected back toward the second quarter waveplate that changes the polarization of the portion of the image light to form second nonlinearly polarized light. The second nonlinearly polarized light is transmitted to the Fresnel surface that reflects a portion of the second nonlinearly polarized light to form third nonlinearly polarized light that has a handedness that is opposite the second nonlinearly polarized light. The third nonlinearly polarized light is changed to fourth linear polarized light by the second quarter waveplate. The fourth linear polarized light has an orientation that matches the particular orientation and is transmitted by the linear reflective polarizer.

In some embodiments, a lens block comprises a plurality of optical elements including a Fresnel surface. The plurality of optical elements are configured to change polarization of image light entering from a first direction to a first polarization with a first polarization rotation direction; to reflect the image light with the first polarization towards a second direction, opposite the first direction, and maintain the first polarization rotation; reflect the image light with the first polarization from the second direction towards the first direction and change the polarization of the image light to a second polarization with a second polarization rotation direction different from the first polarization rotation direction; and transmit the image light with the second polarization and first direction.

In some embodiments, the pancake lens block is a single optical structure with a first side and a second side that is opposite the first side. The Fresnel surface is part of the first side, and it is coupled to the first quarter waveplate. The second side is coupled to the second quarter waveplate, and the second quarter waveplate is coupled to the linear reflective polarizer.

A pancake lens block varies a focal length of optics to enhance displayed images in compact head-mounted displays (HMDs) without decreasing field of views in artificial reality environment. In some embodiments, the pancake lens block is part of a HMD to receive image light from an electronic display, and to present the image light in an image plane. The Fresnel surface and the first quarter waveplate are part of a first optical element, and the second quarter waveplate and the linear reflective polarizer are part of a second optical element. The first optical element and the second optical element of the pancake lens block can allow for a range of optical powers (or focal lengths) to be provided in the HMD. The HMD also includes a varifocal actuation block to adjust a distance between the first optical element (or the second optical element) and the electronic display to adjust a location of the image plane.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes looks at a new object at a distance different from an object they had been looking at, the eyes automatically change focus (by changing their shape) to provide accommodation at the new distance or vergence depth of the new object.

Figure 1A:
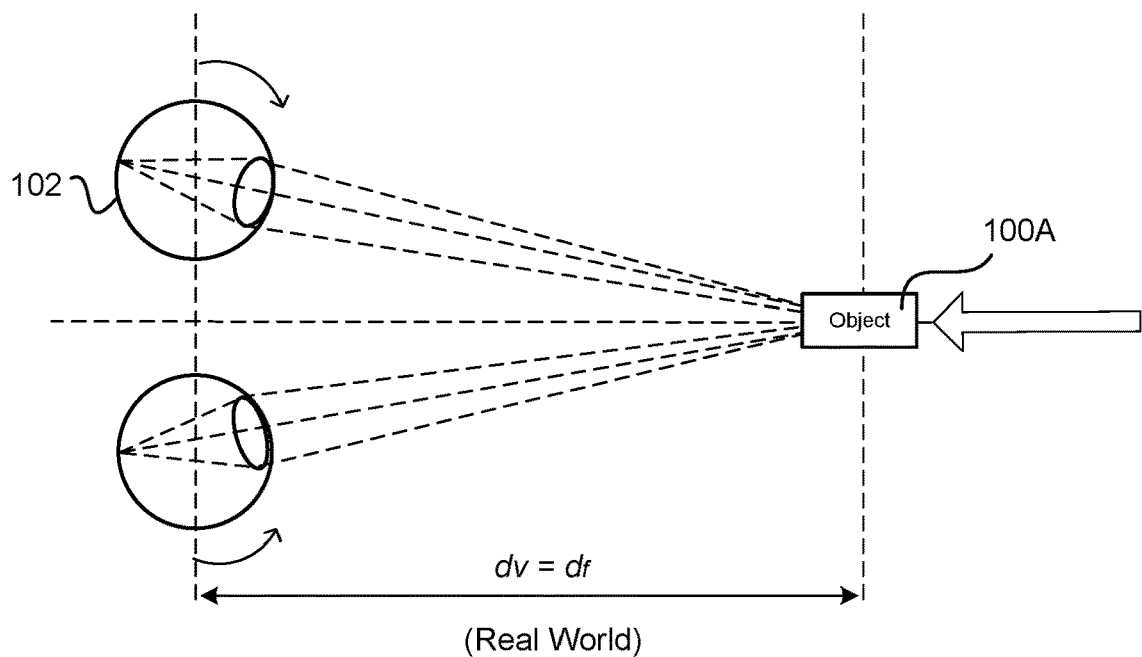
FIG. 1A shows an example of how the human eye experiences vergence and accommodation in the real world.

FIG. 1A shows an example of how the human eye experiences vergence and accommodation in the real world. In the example of FIG. 1A, the user is looking at a real object 100A (i.e., the user's eyes are verged on the real object 100A and gaze lines from the user's eyes intersect at the real object 100A). As the real object 100A is moved closer to the user, as indicated by the arrow in FIG. 1A, each eye 102 rotates inward (i.e., convergence) to stay verged on the real object 100A. As the real object 100A gets closer, each eye 102 must "accommodate" for the closer distance by changing its shape to reduce the power or focal length. Thus, under normal conditions in the real world, the vergence depth ($d_v$) equals the focal length ($d_f$).

Figure 1B:
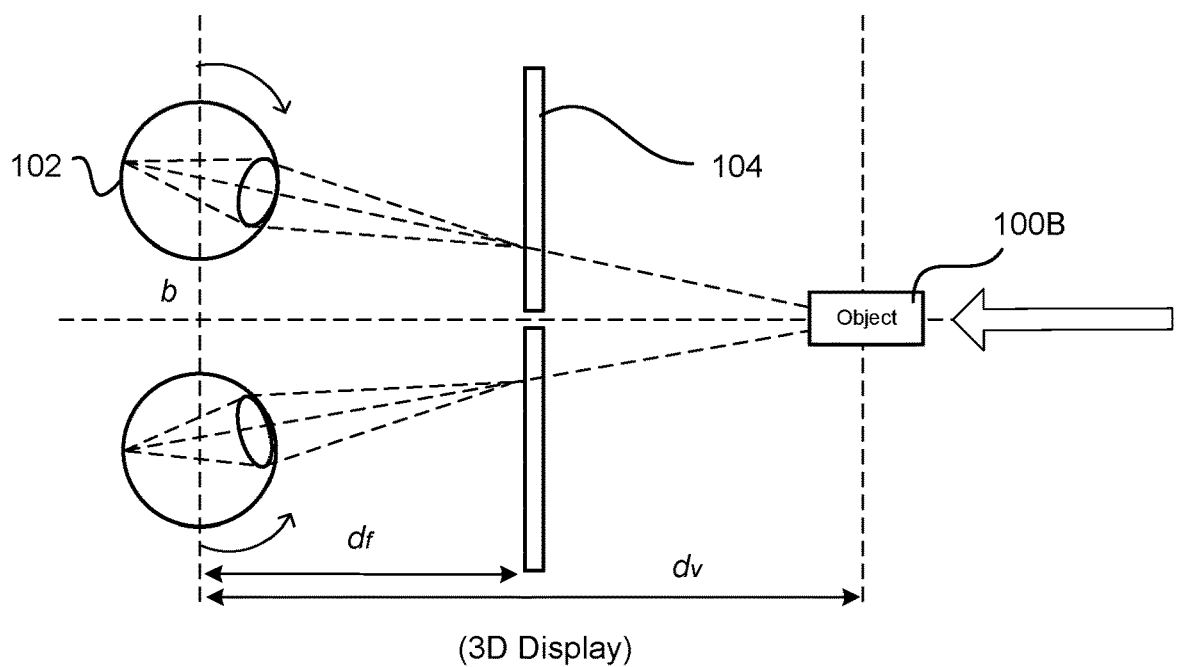
FIG. 1B shows an example conflict between vergence and accommodation that can occur with some three-dimensional displays

FIG. 1B shows an example conflict between vergence and accommodation that can occur with some three-dimensional displays. In this example, a user is looking at a virtual object 100B displayed on a 3D electronic screen 104; however, the user's eyes are verged on and gaze lines from the user's eyes intersect at the virtual object 100B, which is a greater distance from the user's eyes than the 3D electronic screen 104. As the virtual object 100B is rendered on the 3D electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or focal length to accommodate for the closer vergence depth, each eye 102 maintains accommodation at a distance associated with the 3D electronic display 104. Thus, the vergence depth ($d_v$) often does not equal the focal length ($d_f$) for the human eye for objects displayed on 3D electronic displays. This discrepancy between vergence depth and focal length is referred to as "vergence-accommodation conflict." A user experiencing only vergence or accommodation and not both will eventually experience some degree of fatigue and nausea, which is undesirable for virtual reality system creators.

Figure 2A:
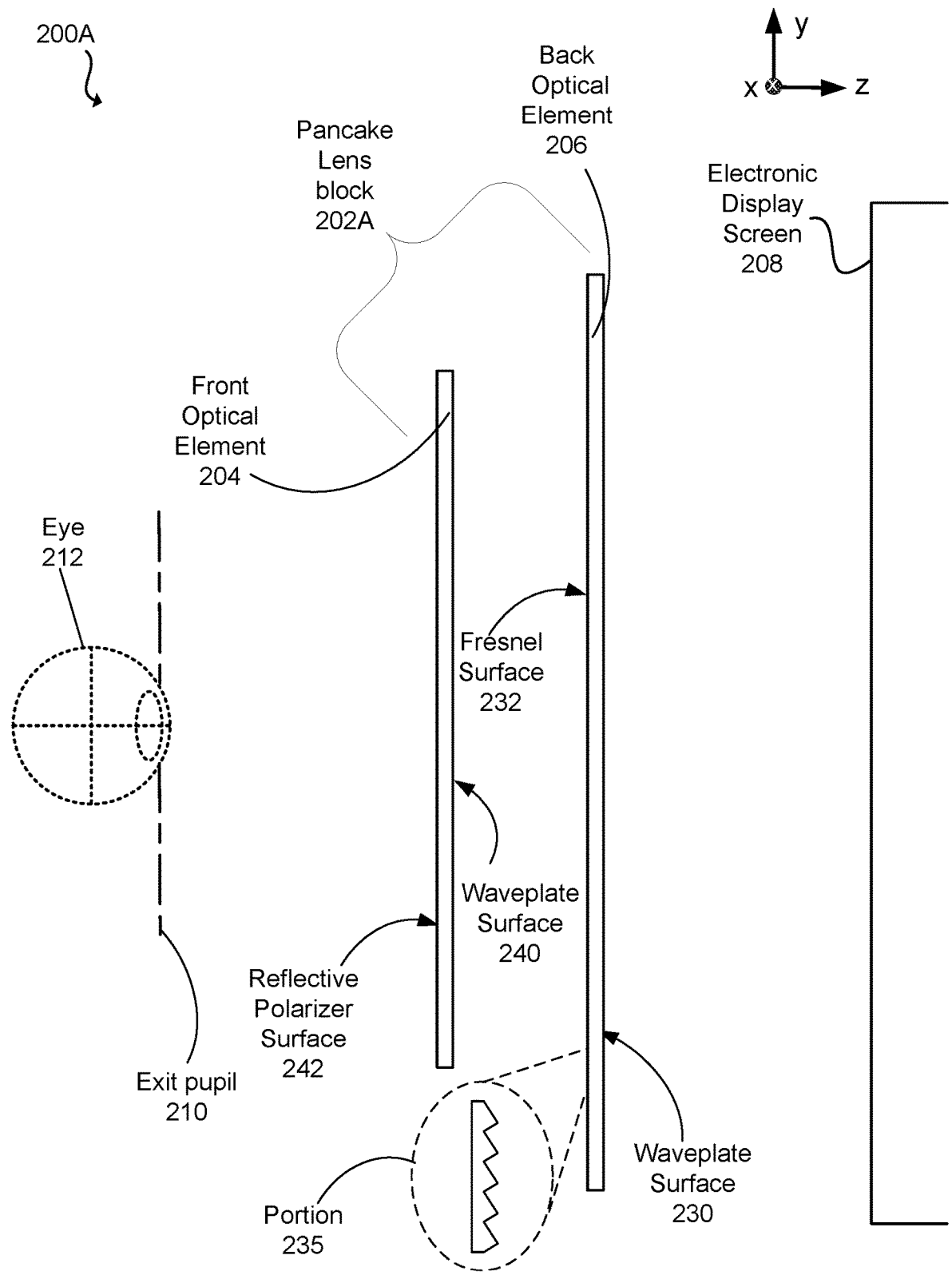
FIG. 2A shows a cross section of a pancake lens block, in accordance with an embodiment.

FIG. 2A is a cross section 200A of a pancake lens block 202A, in accordance with an embodiment. In some embodiments, the pancake lens block 202A is part of a head mounted display (HMD). FIG. 2A shows the pancake lens block 202A is associated with a single eye 212, but another pancake lens block, separate from the pancake lens block 202A, can provide altered image light to another eye of the user. Some embodiments of the pancake lens block 202A have different components than those described here. Similarly, in some cases, functions can be distributed among the components in a different manner than is described here.

Light emitted from an electronic display screen 208 is linearly polarized. In some embodiments, the electronic display screen 208 includes one or more linear polarizers that linearly polarizes light emitted from the electronic display screen 208. Alternatively, light emitted from light emitting components (e.g., LEDs) is emitted as linearly polarized light.

The pancake lens block 202A collimates light from the electronic display screen 208 to an exit pupil 210 where a user's eye 212 is positioned. The pancake lens block 202A includes a front optical element 204 and a back optical element 206. In the embodiment of FIG. 2A, there is a distance (e.g., an air gap) between the front optical element 204 and the back optical element 206. Alternatively, the front optical element 204 and the back optical element 206 are integrated to form a single optical structure as further described in FIG. 2B.

The front optical element 204 has one or more flat surfaces such that one or more reflective polarizers and waveplates can be laminated on the flat surfaces. The back optical element 206 includes one or more Fresnel surfaces to correct filed aberrations of the pancake lens block 202A. In some embodiments, one or more surfaces of the front optical element 206 or the back optical element 204 may be shaped to be spherically concave (e.g., a portion of a sphere), spherically convex, a rotationally symmetric asphere, a freeform shape, or some other shape that mitigates field curvature. In some embodiments, the shape of one or more surfaces of the front optical element 204 and the back optical element 206 are designed to additionally correct for other forms of optical aberration. In some embodiments, one or more of the optical elements within the pancake lens block 202A may have one or more coatings, such as anti-reflective coatings, to reduce ghost images and enhance contrast.

The back optical element 206 includes a waveplate surface 230 and a Fresnel surface 232. The waveplate surface 230 changes a polarization of received light that is linearly polarized to nonlinearly polarized light, to form first nonlinearly polarized light. In this example, the waveplate surface 230 is a quarter-waveplate that changes polarization of received linearly polarized light to first circularly polarized light. Additionally, the waveplate surface 230 (quarter-waveplate) has an axis 45 degrees (or some other orientation that results in a circularly polarized light) relative to the y direction (which is the direction of polarization of the light), as further described in FIG. 3. Likewise, a quarter-waveplate can convert nonlinearly polarized light to linearly polarized light. In various embodiments, the waveplate surface 230 changes a polarization of received light that is linearly polarized to elliptically polarized light, to form first elliptically polarized light. For example, the waveplate surface 230 has a retardance equal to a quarter of a wave+/−25 nanometers (nm). In other example, the waveplate surface 230 has an axis 45 degrees+/−10 degrees (or some other orientation that results in an elliptically polarized light) relative to the y direction (which is the direction of polarization of the light).

Quarter-waveplates are usually made of birefringent materials such as quartz, organic material sheets, or liquid crystal. In some embodiments, the waveplate surface 230 may be shaped to be spherically concave (e.g., a portion of a sphere), spherically convex, a rotationally symmetric asphere, a freeform shape, or some other curved shape that forms first nonlinearly (e.g., circularly or elliptically) polarized light. In various embodiments, the back optical element 206 includes the Fresnel surface 232 only. For example, the waveplate surface 230 is attached to the electronic display 208.

The Fresnel surface 232 transmits a portion (e.g., 50%) of the first circular polarized light, and partially reflects a portion (e.g., 50%) of the received light from the front optical element 204. A portion 235 of the Fresnel surface 232 shows that, as further described in FIGS. 4A and 4B, the Fresnel surface 232 includes a set of slope facets and a set of draft facets, and the set of slope facets are coated with a partial reflective coating that reflects light from the front optical element 204. In some embodiments, with coatings (e.g., multiple-layer coatings), a transmission/reflection ratio of the partial reflective coating can be adjusted. In some embodiments, the Fresnel surface 232 may be shaped to be spherically concave (e.g., a portion of a sphere), spherically convex, a rotationally symmetric asphere, a freeform shape, or some other curved shape that forms first nonlinearly (e.g., circularly or elliptically) polarized light.

In some embodiments, the Fresnel surface 232 is part of a Fresnel lens. The Fresnel lens is flat, curved, or has some other shape that mitigates field aberrations. The Fresnel surface 232 mitigates a field curvature of the pancake lens block 202A and accordingly acts to increase resolution and reduce pupil swim. The field curvature is an optical aberration that causes a flat object to appear sharp only in a certain part(s) of the frame, instead of being uniformly sharp across the frame. More generally, the field curvature is a result of a focal distance of an optics system not perfectly aligning with all the points on a focal plane. This can lead to resolution loss in the field. The pupil swim is the effect caused by changes in the location of a user's eye within an eyebox results in distortions in the content being presented to the user. Correcting for the field curvature mitigates the pupil swim. As such, the Fresnel surface 232 mitigates the field curvature in an image that is output to a user's eyes to reduce the pupil swim. Additionally, in some embodiments, the Fresnel surface 232 allows the pancake lens block 202A to be flat (nearly flat) such that one or more optical coatings (e.g., reflective polarizers and waveplates) can be laminated on the flat surfaces. As such, the pancake lens block 202A can be mass-produced with a small form factor and relatively low weight compared to other optical systems designed to remove field curvature, while having a wide field of view. An example of the Fresnel surface 232 is further discussed below with regard to FIGS. 4A and 4B.

The front optical element 204 includes a waveplate surface 240 and a reflective polarizer surface 242. The waveplate surface 240 is a second quarter-waveplate to change a polarization of the first nonlinearly (e.g., circularly or elliptically) polarized light to linear polarized light, to form first linearly polarized light. The reflective polarizer surface 242 transmits linear polarized light of a particular orientation and reflect light of other orientations, and the first linearly polarized light has an orientation that is orthogonal to the particular orientation. For example, the reflective polarizer surface 242 is a partially reflective mirror to reflect linearly polarized light with an orientation in the x direction, and pass light that is linearly polarized in the y direction. Nonlinearly polarized light (such as circular and elliptical polarized light) has a polarization orientation that changes overtime. In other words, a polarization rotation direction of the nonlinearly light changes overtime. For example, the polarization orientation may rotate in a clockwise or counter clockwise (sometimes referred to as a right hand or left hand rotation) direction over time. In some embodiments, reflecting nonlinearly polarized light will reverse the polarization rotation direction of the nonlinear polarized light. In some embodiments, the front optical element 204 (e.g., the waveplate surface 240, the reflective polarizer surface 242, or both) may be shaped to be spherically concave (e.g., a portion of a sphere), spherically convex, a rotationally symmetric asphere, a freeform shape, or some other curved shape that forms first nonlinearly (e.g., circularly or elliptically) polarized light.

Figure 2B:
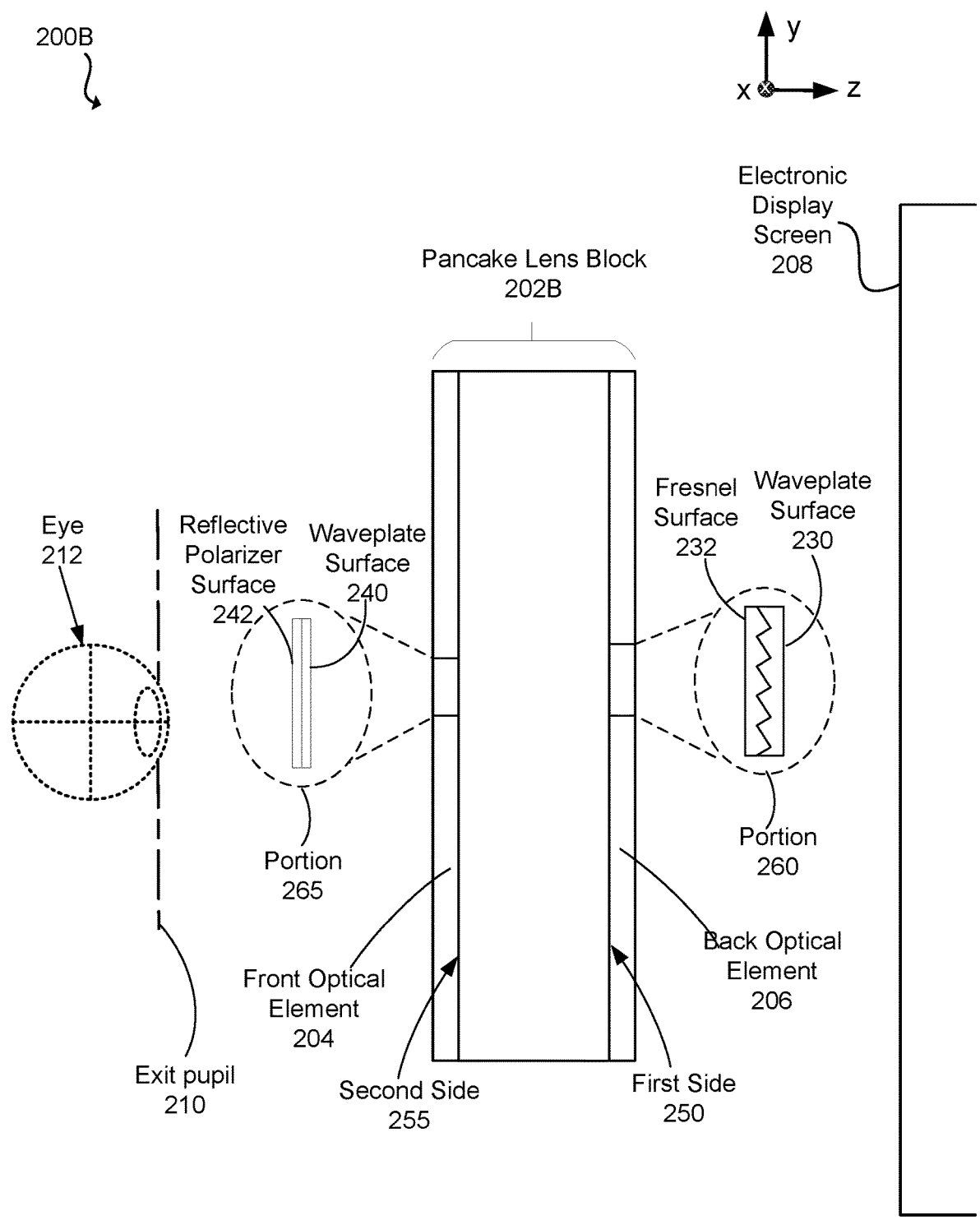
FIG. 2B shows a cross section of a pancake lens block, in accordance with another embodiment.

FIG. 2B is a cross section 200B of a pancake lens block 202B, in accordance with another embodiment. In some embodiments, the pancake lens block 202B is part of a head mounted display (HMD). FIG. 2B shows the pancake lens block 202B is associated with a single eye 212, but another pancake lens block, separate from the pancake lens block 202B, can provide altered image light to another eye of the user. Some embodiments of the pancake lens block 202B have different components than those described here. Similarly, in some cases, functions can be distributed among the components in a different manner than is described here.

In the embodiment of FIG. 2B, the pancake lens block 202B is a single optical structure with a first side 250 and a second side 255 that is opposite the first side 250. The first side 250 is closer to the electronic display screen 208 than the second side 255. The back optical element 206 is coupled to the first side 250, and the front optical element 204 is coupled to the second side 255 to form a monolithic pancake lens block 202B. For example, a portion 255 of the back optical element 206 shows that the Fresnel surface 232 is part of the first side 250, and the Fresnel surface 232 is coupled to the first waveplate surface 230. The first waveplate surface 230 is closer to the electronic display screen 208 than the Fresnel surface 232. In some embodiments, the Fresnel surface 232 is coupled to the first side 250, and the Fresnel surface 232 is coupled to the first waveplate surface 230. In some embodiments, there is a gap (e.g., an air gap) between the Fresnel surface 232 and the first waveplate surface 230. A portion 265 of the front optical element 204 shows that the second waveplate surface 240 is part of the second side 255, and the reflective polarizer surface 242 is coupled to the reflective polarizer surface 242. The reflective polarizer surface 242 is closer to the exit pupil 210 than the second waveplate surface 240. In some embodiments, the second waveplate surface 240 is coupled to the second side 255, and the second waveplate surface 240 is coupled to the reflective polarizer surface 242. In some embodiments, there is a gap (e.g., an air gap) between the second waveplate surface 240 and the reflective polarizer surface 242. The pancake lens block 202B reduces the amount of parasitic reflections between the front optical element 204 and the back optical element 206. As such, the pancake lens block 202B reduces ghost images and enhances the image contrast.

In some embodiments (not shown), the pancake lens block 202B includes an additional Fresnel surface (e.g., an embodiment of the Fresnel surface 232) that is coupled to the reflective polarizer surface 242 and is placed between the exit pupil 210 and the reflective polarizer surface 242. Facets of the additional Fresnel surface receive light from the reflective polarizer 242. By adding the additional Fresnel surface, the pancake lens block 202B further reduces aberrations by exploiting additional degrees of freedom in the optical design.

The received light from the electronic display screen 208 is reflected back and forth between the back optical element 206 and the front optical element 204. For example, the first linearly polarized light is reflected back toward the waveplate surface 240 that changes the polarization of the portion of the received light to form second nonlinearly (e.g., circularly or elliptically) polarized light, and the second nonlinearly polarized light is transmitted to the Fresnel surface 232 that reflects a portion of the second nonlinearly polarized light to form third nonlinearly (e.g., circularly or elliptically) polarized light that has a handedness that is opposite the second nonlinearly polarized light, the third nonlinearly polarized light is changed to fourth linear polarized light by the waveplate surface 240, and the fourth linear polarized light has an orientation that matches the particular orientation and is transmitted by the reflective polarizer surface 242.

Figure 3:
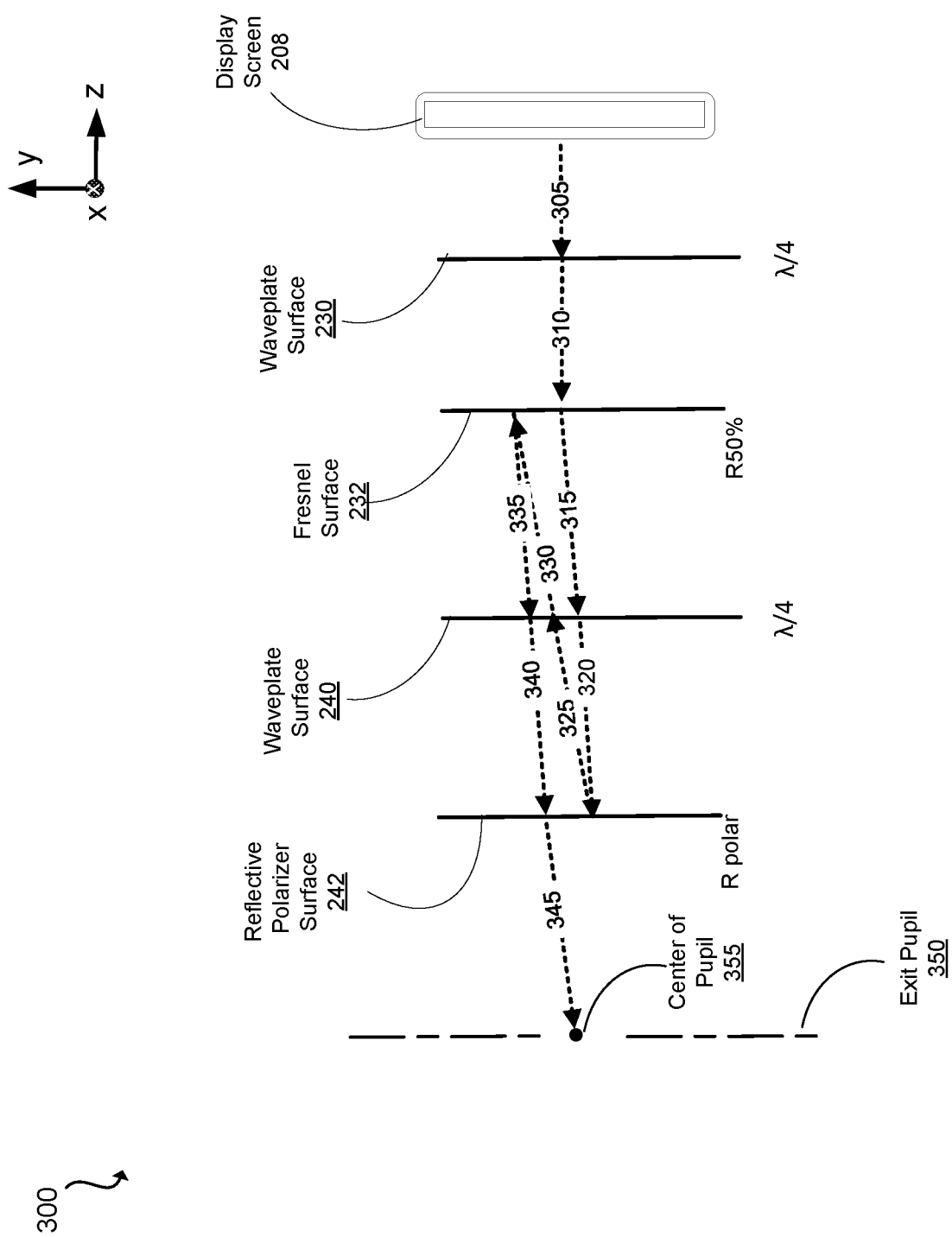
FIG. 3 shows example light propagation in a pancake lens block, in accordance with an embodiment

Embodiments described above have Fresnel surfaces, providing reflective surfaces, to form a cavity between the front optical element 204 and the back optical element 206 such that light is reflected back and forth in the cavity, as further described in FIG. 3. In alternative embodiments, the Fresnel surface resides outside of the cavity of the pancake lens block.

Figure 2C:
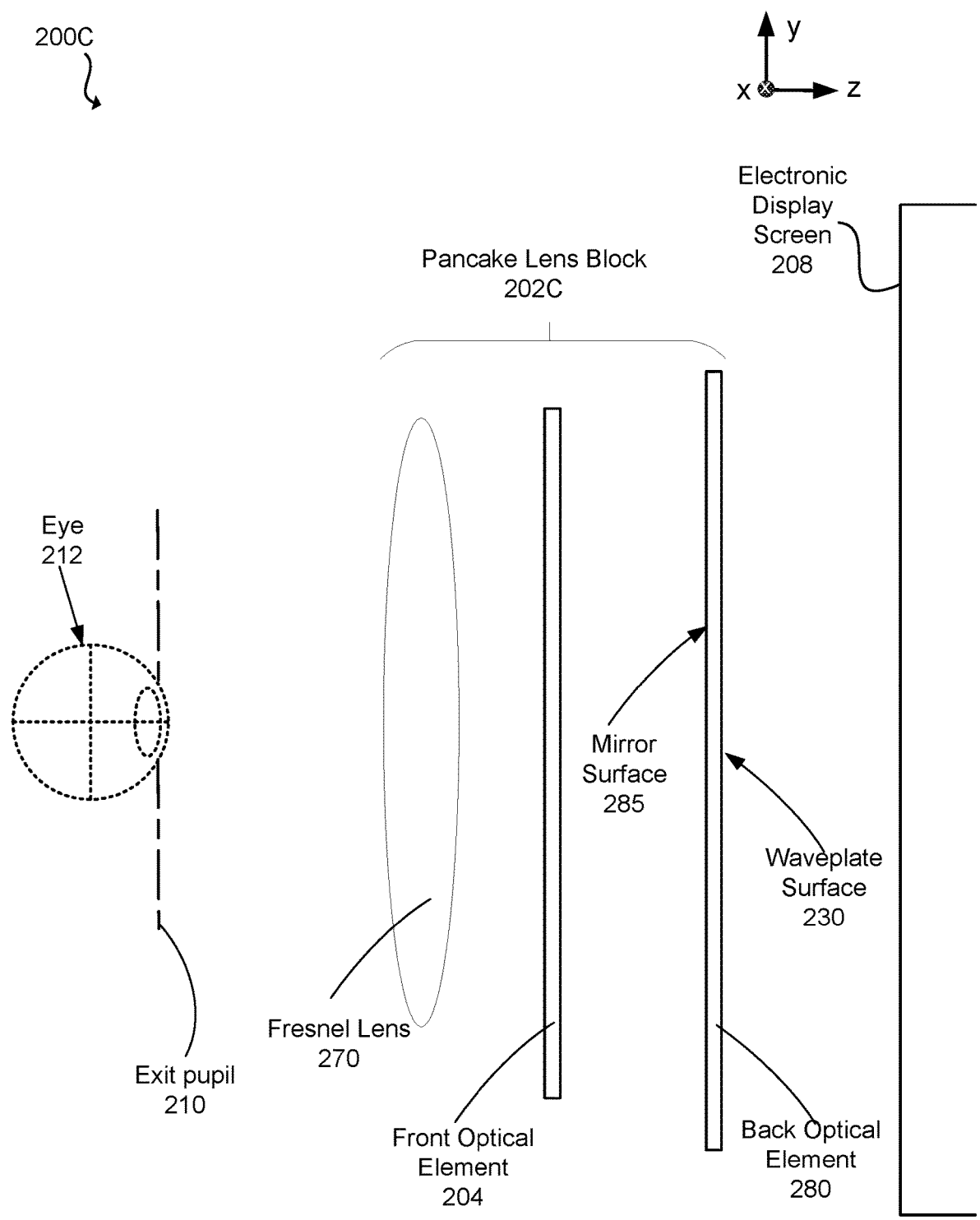
FIG. 2C shows a cross section of a pancake lens block including a Fresnel lens, in accordance with an embodiment.

FIG. 2C shows a cross section 200C of a pancake lens block 202C including a Fresnel lens 270, in accordance with an embodiment. As shown in FIG. 2C, the Fresnel lens 270 resides outside of (i.e., separate from) the back optical element 280 and is placed between the eye and the front optical element 204. The pancake lens block 202C forms a cavity between the front optical element 204 and a back optical element 280. The back optical element 280 has a mirror surface 285 and the waveplate surface 230. In some embodiments (not shown), the back optical element 280 has a singular mirror surface 285, and the waveplate surface 230 is attached to the electronic display screen 208. Alternatively, the front optical element 204 and the back optical element 280 are integrated to form a single optical structure. The mirror surface 285 is partially reflective to reflect a portion of the received light. In some embodiments, mirrored surface 232 is configured to transmit 50% of incident light and reflect 50% of incident light. In some embodiments, the mirror surface 285 is an embodiment of the Fresnel surface 232. In some embodiments, the Fresnel lens 270 is placed between the back optical element 280 and the electronic display. Having the Fresnel surface 232 outside of the cavity enhances stray light performance such that one chief ray transmits through the Fresnel lens 270 to make it easier for dynamic drafting and suppression of stray light modes.

For all the embodiments described above, the locations of the reflective polarizer surface 242 and the Fresnel surface 232 (or the mirror surface 285) can be switched. In various embodiments, the whole sequence of the surfaces can be reversed. For example, the waveplate surface 230 and the Fresnel surface 232 (or the mirror surface 280) are close to the eye 212, and the reflective polarizer surface 242 faces the electronic display screen 208.

FIG. 3 shows example light propagation in a pancake lens block (e.g., 202A or 202B), in accordance with an embodiment. Light 305 from the electronic display screen 208 is linearly polarized. The waveplate surface 230 (quarter-waveplate) has an axis 45 degrees or 45 degrees+/−10 degrees (or some other orientation that results in a circularly or elliptically polarized light) relative to the y direction (which is the direction of polarization of the light 305). The orientation of the waveplate axis relative to the incident linearly polarized light controls the handedness of the emitted nonlinearly polarized light. The waveplate surface 230 changes the polarization of the light 305 from linear polarization to circular polarization—shown as light 310. The polarization of the light 310 may be clockwise or anti-clockwise based on the orientation of the axis of the waveplate surface 230 relative to incident linearly polarized light. A first portion of the light 310 is reflected by the Fresnel surface 232, and a second portion of light 315 is transmitted by the Fresnel surface 232 towards the waveplate surface 240. In some embodiments, the Fresnel surface 232 reflects 50% of incident light (e.g., the light 310). Similarly, the waveplate surface 240 is a quarter-waveplate and changes the polarization of the light 315 from circular to linear (referred to as light 320).

The light 320 is incident on the reflective polarizer surface 242, which reflects light that is polarized in a blocking direction (e.g., x direction) and transmits light that is polarized in a perpendicular direction (e.g., y direction). At this point, the light 320 is linearly polarized in the blocking direction. Thus, the reflective polarizer surface 242 reflects the light 320 and the reflected light is referred to as light 325. The waveplate surface 240 changes the linear polarized light 325 to nonlinearly polarized light 330, and the Fresnel surface 232 reflects a portion of the polarized light 330, as described above. The reflected portion of light 330 is referred to as light 335.

The light 335 is also nonlinearly polarized; however, its handedness is opposite that of the light 330 and 315 due to the reflection from the Fresnel surface 232. Thus, the waveplate surface 240 changes the polarization of nonlinearly polarized light 235 to linearly polarized light 340. However, as the handedness of the light 235 is opposite to that of the light 315, the polarization of the light 340 is perpendicular to that of the light 320. Accordingly, the light 340 is linearly polarized in a direction (e.g., y) perpendicular to the blocking direction (e.g., x) and is therefore transmitted by the reflective polarizer surface 242 as light 345 to exit pupil 350.

Light propagating through the pancake lens, thus, undergoes multiple reflections between the back optical element 206 and the front optical element 204 and passes through multiple materials (i.e., waveplates, reflectors, glass, air, etc.) each having different indices of refraction. These materials can be chosen to allow the back optical element 206 and the front optical element 204 to compensate each other to remove field curvature.

Figure 4A:
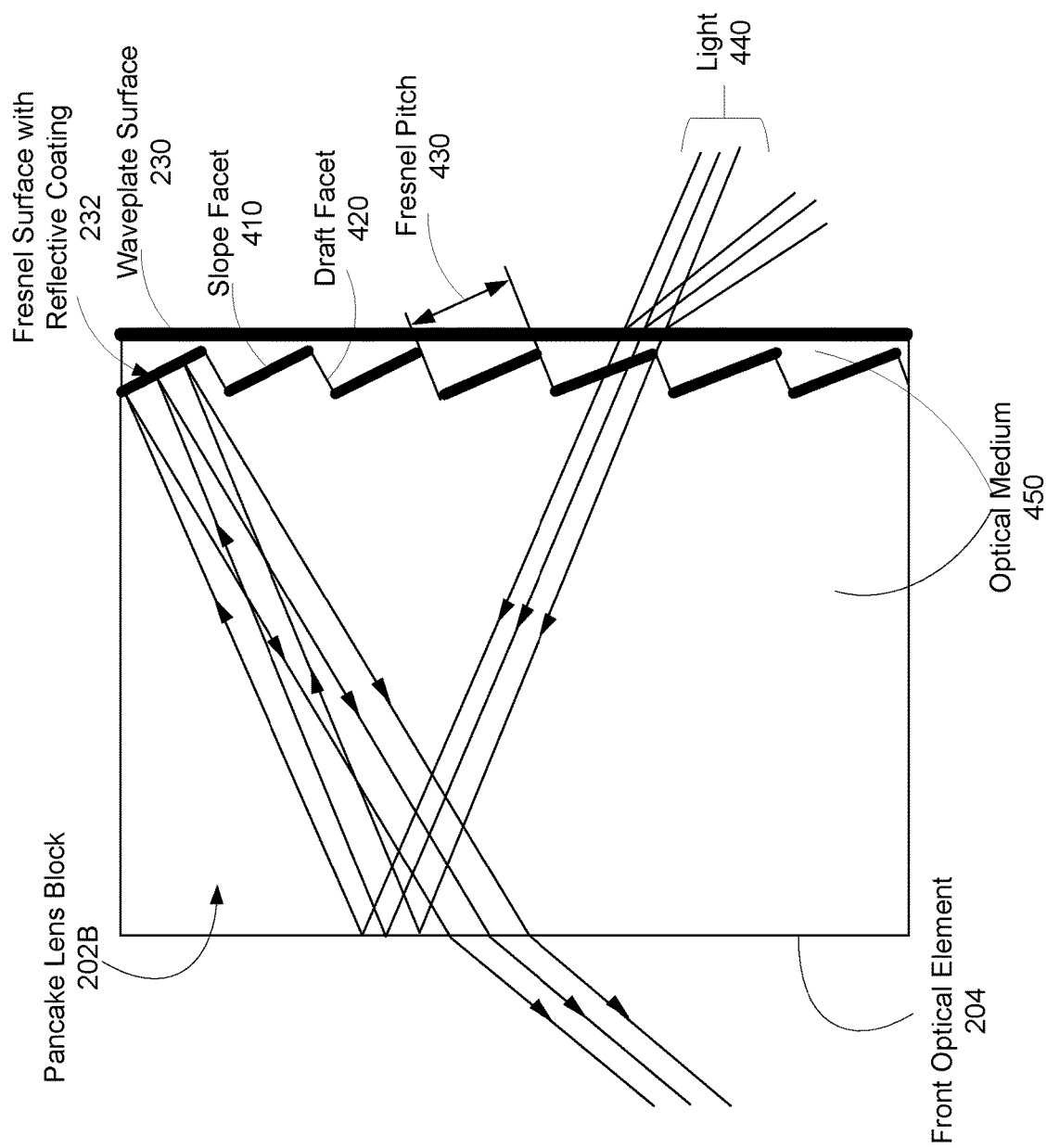
FIG. 4A shows an example of a Fresnel surface in a pancake lens block, in accordance with an embodiment.

FIG. 4A shows an example of the Fresnel surface 232, in accordance with an embodiment. In the embodiment of FIG. 4A, the Fresnel surface 232 and the waveplate surface 232 are part of the pancake lens block 202B. The Fresnel surface 232 includes a set of slope facets 410 marked by bold lines and a set of draft facets 420. The set of slope facets 410 and the set of draft facets 420 transmit a portion (e.g., 50%) of the first circular polarized light 440 from the first waveplate surface (not shown). The set of slope facets 410 are coated with a reflective coating that partially reflects a portion (e.g., 50%) of light received from the front optical element 204. The set of draft facets 420 are substantially transmissive to the light 440, thereby reducing stray light potentially caused by reflections off the draft facets 420, and increasing an overall light transmission of the pancake lens block 202B. An optical medium 450 with the same refractive index is located on both sides of the Fresnel surface 232 (also referred to immersed Fresnel surface) such that the light 440 is not deviated in transmission. Examples of the optical medium include glass, plastic or polymer. In some embodiments, in order to reduce scattering effects introduced by the Fresnel surface 232, each of the set of draft facets 420 is set to be parallel to chief rays of the pancake lens block 202B.

Figure 4B:
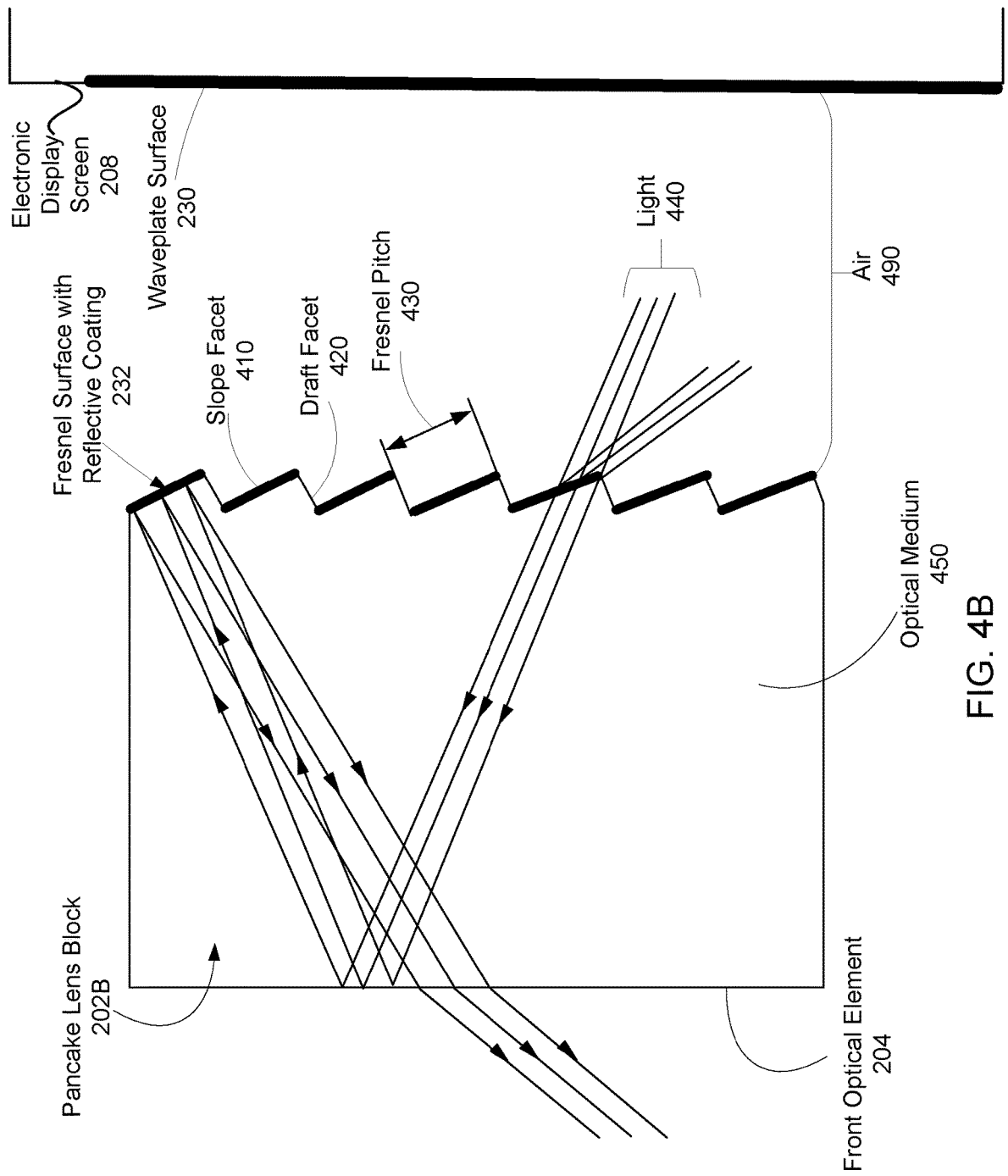
FIG. 4B shows another example of a Fresnel surface in a pancake lens block, in accordance with an embodiment.

FIG. 4B shows an example of the Fresnel surface 232, in accordance with an embodiment. In the embodiment of FIG. 4B, the Fresnel surface 232 is a part of the pancake lens block 202B. The waveplate surface 230 is attached to the electronic display screen 208. The optical medium 450 is located on one side of the Fresnel surface 232 and air 490 is located on the other side of the Fresnel surface 232.

Considerations on Fresnel Surface

To reduce image artifacts caused by visible Fresnel irregularities, a diameter of light (e.g., light 440) projected on the Fresnel surface 232 is larger than a Fresnel pitch 430. As such, a distance (D) between the Fresnel surface 400 and the electronic display screen 208 (not shown) is determined based on a diameter of an eye pupil ($\Phi_{eye}$), a focal length (f) of the Fresnel surface 400, and the Fresnel pitch 430, e.g., $\Phi_{eye}/f*D>Pitch$.

In some embodiments, the Fresnel surface 232 has Fresnel rings with variable pitch. The central part needs the highest resolution and clarity, and therefore will have larger pitch Fresnel rings, to reduce diffraction and stray light artifacts in the central parts of the field of view. The outer part can have smaller pitch Fresnel rings, to reduce visibility of the rings on the edge, where the projected area of the draft facets are larger.

In some embodiments, the Fresnel surface 232 can be fabricated via injection molding. In some embodiments, the pancake lens block 202B is flat, and the Fresnel surface 232 is fabricated on a thin film and is laminated on a flat substrate. The flat substrate can be made of soda lime glass (basically window glass) or any type of low birefringence plastic sheets like Polymethyl methacrylate (PMMA). Fresnel film fabrication can be made by roll to roll replication. As such, the Fresnel pitch 430 is made to be smaller 0.2 mm. In some embodiments, the Fresnel surface 232 is overmolded with an immersion layer that is index matched to the Fresnel surface 232.

In some embodiments, to create the reflective coating on the sets of the slope facets 410 without reflective coating on the draft facets 420, the entire Fresnel surface 232 is coated with the reflective coating 232 and removed from the draft facets 420. In some examples, removal of the reflective coating may be by diamond turning.

System Overview

The pancake lens block (e.g., 202A, or 202B) can allow for a dynamic range of optical powers (or focal lengths) to be provided in a HMD headset by, for example, making relatively small adjustments to the back optical element 206 and/or the front optical element 204. For example, such adjustments can include changing the shape of the back optical element 206 or the front optical element 204 changing the shape of the back optical element 206 and the front optical element 204 in concert, changing the distance between the back optical element 206 and the front optical element 204 to cause light to focus in a different location, thereby adjusting the focal length, or a combination of changing the shape of the optical elements and the distance between them.

Figure 5:
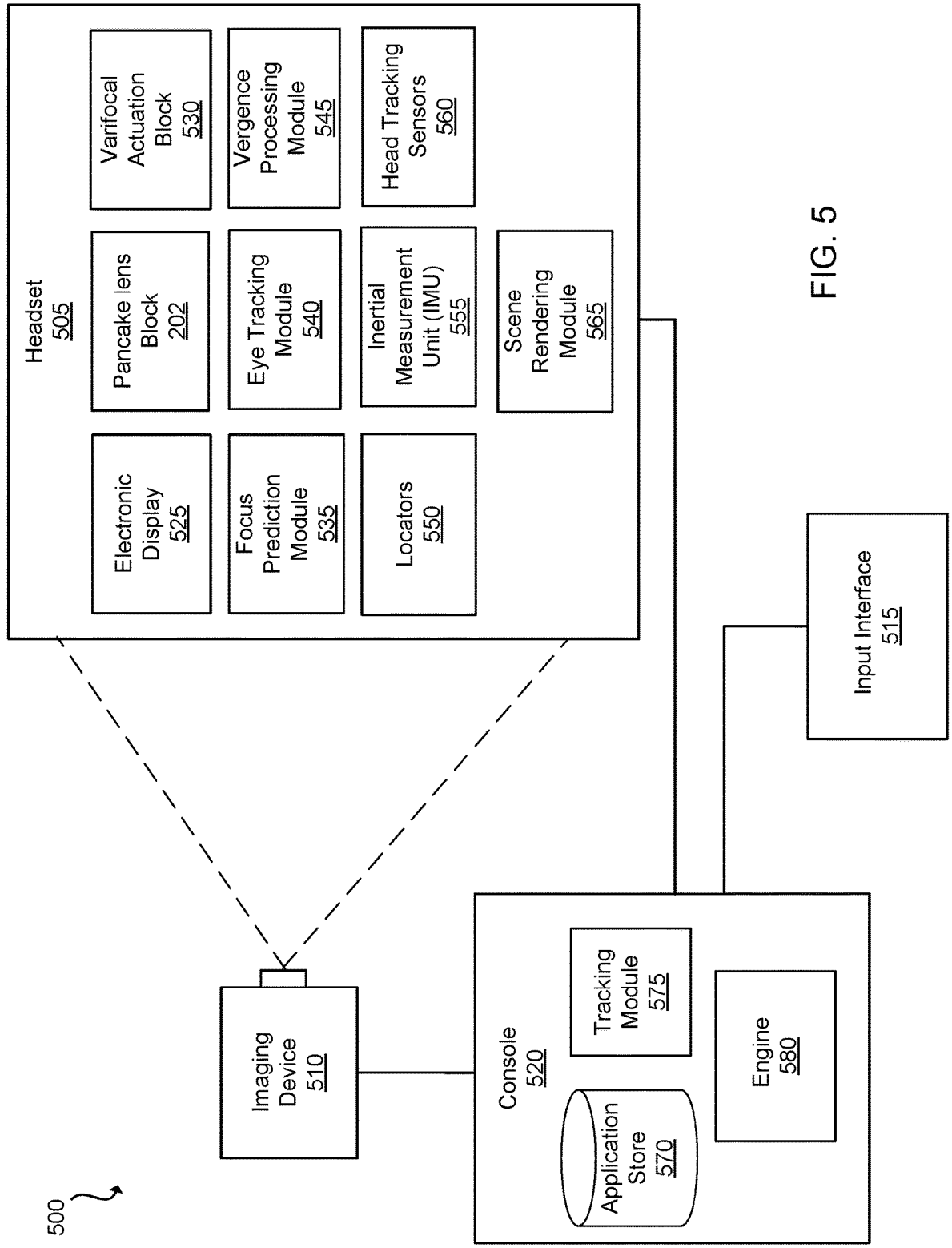
FIG. 5 shows an example head-mounted display (HMD) system, in accordance with an embodiment.

FIG. 5 is a HMD system 500, in accordance with one or more embodiments. In this example, the HMD system environment 500 includes the headset 505, an imaging device 510, and an input/output (I/O) interface 515, which are each coupled to a console 520. While FIG. 5 shows a single headset 505, a single imaging device 510, and a single I/O interface 515, in other embodiments, any number of these components may be included in the system. For example, there may be multiple HMD headsets 505 each having an associated the I/O interface 515 and being monitored by one or more imaging devices 510, with each headset 505, the I/O interface 515, and the imaging devices 510 communicating with the console 520. In alternative configurations, different and/or additional components may also be included in the HMD system environment. In some embodiments, the HMD headset 505 may act as an artificial reality headset. For example, in an AR or MR, the HMD headset 505 displays virtual view or augments views of a physical, real-world environment with computer-generated elements (e.g., images, video, sound, etc.).

The headset 505 presents content to a user. Example content includes images, video, audio, or some combination thereof. Audio content may be presented via a separate device (e.g., speakers and/or headphones) external to the headset 505 that receives audio information from the headset 505, the console 520, or both. The headset 505 includes an electronic display 525, a pancake lens block 202, a varifocal actuation block 530, a focus prediction module 535, an eye tracking module 540, a vergence processing module 545, one or more locators 550, an internal measurement unit (IMU) 555, a head tracking sensors 560, and a scene rendering module 565.

The electronic display screen 525 presents visual information (i.e., image light) from an electronic signal. The electronic display screen 525 may be, e.g., a liquid crystal display (LCD), an organic light emitting diode (OLED) display, an active-matrix organic light-emitting diode display (AMOLED), some type of flexible display, or some combination thereof. In some embodiments, electronic display screen 525 includes a linear polarizer or admits light that is linearly polarized. In some embodiments, the electronic display screen 525 may be, e.g., the electronic display screen 208.

The pancake lens block 202 directs light from the electronic display 525 to an exit pupil for viewing by a user using one or more optical elements in addition to the two optical elements described in FIGS. 2A, 2B, 3 and 4. For example, the one or more optical elements may include apertures, Fresnel lenses, convex lenses, concave lenses, filters, and so forth, and may include combinations of different optical elements. In some embodiments, one or more of the optical elements of the pancake lens block 202 may have one or more coatings, such as anti-reflective coatings. Magnification of the image light by the pancake lens block 202 allows the electronic display 525 to be physically smaller, weigh less, and consume less power than larger displays. Additionally, magnification of the image light may increase a field of view of the displayed content.

For example, the field of view of the displayed content is such that the displayed content is presented using almost all (e.g., 150 degrees diagonal), and in some cases all, of the user's field of view.

The varifocal actuation block 530 includes a varifocal element that causes the pancake lens block 202 to vary the focal length (or optical power) of the headset 505 to keep a user's eyes in a zone of comfort as vergence and accommodation change. In one embodiment, the varifocal actuation block 530 physically changes the distance between the two optical elements of the pancake lens block 202. Alternatively, the varifocal actuation block 530 changes the focal length of the pancake lens block 202 by applying a force to one of the back optical element 206 or the front optical element 204 described in FIGS. 2A, and 2B. Thus, the varifocal actuation block 530 may include actuators, motors, vacuum pressure, and so forth that change the shape of at least one optical element of the pancake lens block 202.

Each state of the pancake lens block 202 corresponds to a focal length of the headset 505 or to a combination of the focal length and eye position relative to the pancake lens block 202 (as discussed further below). Any number of states could be provided; however, a limited number of states accommodate the sensitivity of the human eye, allowing some embodiments to include fewer focal lengths. The varifocal actuation block 530, thus, sets and changes the state of the pancake lens block 202 to achieve a desired focal length.

The focus prediction module 535 is an encoder including logic that tracks the state of the pancake lens block 202 to predict to one or more future states of the pancake lens block 202. For example, the focus prediction module 535 accumulates historical information corresponding to previous states of the pancake lens block 202 and predicts a future state of the pancake lens block 202 based on the previous states. Because rendering of a scene by the headset 505 is adjusted based on the state of the pancake lens block 202, the predicted state allows the scene rendering module 565, further described below, to determine an adjustment to apply to the scene for a particular frame. Accordingly, the focus prediction module 535 communicates information describing a predicted state of the pancake lens block 202 for a frame to the scene rendering module 565. Adjustments for the different states of the pancake lens block 202 performed by the scene rendering module 565 are further described below.

The eye tracking module 540 tracks an eye position and eye movement of a user of the headset 505. A camera or other optical sensor inside the headset 505 captures image information of a user's eyes, and the eye tracking module 540 uses the captured information to determine interpupillary distance, interocular distance, a three-dimensional (3D) position of each eye relative to the headset 505 (e.g., for distortion adjustment purposes), including a magnitude of torsion and rotation (i.e., roll, pitch, and yaw) and gaze directions for each eye. In one example, infrared light is emitted within the headset 505 and reflected from each eye. The reflected light is received or detected by the camera and analyzed to extract eye rotation from changes in the infrared light reflected by each eye. Many methods for tracking the eyes of a user can be used by the eye tracking module 540. Accordingly, the eye tracking module 540 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, the eye tracking module 540 integrates information from past measurements, measurements identifying a position of a user's head, and 3D information describing a scene presented by the display screen 525. Thus, information for the position and orientation of the user's eyes is used to determine the gaze point in a scene presented by the headset 505 where the user is looking.

The vergence processing module 545 determines a vergence depth of a user's gaze based on the gaze point or an estimated intersection of the gaze lines determined by the eye tracking module 540. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 545 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 550 are objects located in specific positions on the headset 505 relative to one another and relative to a specific reference point on the headset 505. The locator 550 may be a light emitting diode (LED), a corner cube reflector, a reflective marker, a type of light source that contrasts with an environment in which the headset 505 operates, or some combination thereof. Active locators 550 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 550 can be located beneath an outer surface of the headset 505, which is transparent to the wavelengths of light emitted or reflected by the locators 550 or is thin enough not to substantially attenuate the wavelengths of light emitted or reflected by the locators 550. Further, the outer surface or other portions of the headset 505 can be opaque in the visible band of wavelengths of light. Thus, the locators 550 may emit light in the IR band while under an outer surface of the headset 505 that is transparent in the IR band but opaque in the visible band.

The IMU 555 is an electronic device that generates fast calibration data based on measurement signals received from one or more of the head tracking sensors 560, which generate one or more measurement signals in response to motion of the headset 505. Examples of the head tracking sensors 560 include accelerometers, gyroscopes, magnetometers, other sensors suitable for detecting motion, correcting error associated with the IMU 555, or some combination thereof. The head tracking sensors 560 may be located external to the IMU 555, internal to the IMU 555, or some combination thereof.

Based on the measurement signals from the head tracking sensors 560, the IMU 555 generates fast calibration data indicating an estimated position of the headset 505 relative to an initial position of the headset 505. For example, the head tracking sensors 560 include multiple accelerometers to measure translational motion (forward/back, up/down, left/right) and multiple gyroscopes to measure rotational motion (e.g., pitch, yaw, and roll). The IMU 555 can, for example, rapidly sample the measurement signals and calculate the estimated position of the headset 505 from the sampled data. For example, the IMU 555 integrates measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, in various embodiments, reference point is defined as a point within the headset 505 (e.g., a center of the IMU 555). Alternatively, the IMU 555 provides the sampled measurement signals to the console 520, which determines the fast calibration data.

The IMU 555 can additionally receive one or more calibration parameters from the console 520. As further discussed below, the one or more calibration parameters are used to maintain tracking of the headset 505. Based on a received calibration parameter, the IMU 555 may adjust one or more IMU parameters (e.g., sample rate). In some embodiments, certain calibration parameters cause the IMU 555 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene render module 565 receives content for the scene from the engine 580 and provides the content for display on the electronic display 525. Additionally, the scene render module 565 can adjust the content based on information from the focus prediction module 535, the vergence processing module 545, the IMU 555, and the head tracking sensors 560. For example, upon receiving the content from the engine 580, the scene render module 565 adjusts the content based on the predicted state (i.e., eye position and focal length) of the pancake lens block 202 received from the focus prediction module 535. Additionally, the scene render module 565 determines a portion of the content to be displayed on the electronic display 525 based on one or more of the tracking module 575, the head tracking sensors 560, or the IMU 555, as described further below.

The imaging device 510 generates slow calibration data in accordance with calibration parameters received from the console 520. Slow calibration data includes one or more images showing observed positions of the locators 550 that are detectable by the imaging device 510. The imaging device 510 may include one or more cameras, one or more video cameras, other devices capable of capturing images including one or more locators 550, or some combination thereof. Additionally, the imaging device 510 may include one or more filters (e.g., for increasing signal to noise ratio). The imaging device 510 is configured to detect light emitted or reflected from the locators 550 in a field of view of the imaging device 510. In embodiments where the locators 550 include passive elements (e.g., a retroreflector), the imaging device 510 may include a light source that illuminates some or all of locators 550, which retro-reflect the light towards the light source in the imaging device 510. Slow calibration data is communicated from the imaging device 510 to the console 520, and the imaging device 510 receives one or more calibration parameters from the console 520 to adjust one or more imaging parameters (e.g., focal length, focus, frame rate, ISO, sensor temperature, shutter speed, aperture, etc.).

The I/O interface 515 is a device that allows a user to send action requests to the console 520. An action request is a request to perform a particular action. For example, an action request may be to start or end an application or to perform a particular action within the application. The I/O interface 515 may include one or more input devices. Example input devices include a keyboard, a mouse, a game controller, or any other suitable device for receiving action requests and communicating the received action requests to the console 520. An action request received by the I/O interface 515 is communicated to the console 520, which performs an action corresponding to the action request. In some embodiments, the I/O interface 515 may provide haptic feedback to the user in accordance with instructions received from the console 520. For example, haptic feedback is provided by the I/O interface 515 when an action request is received, or the console 520 communicates instructions to the I/O interface 515 causing the I/O interface 515 to generate haptic feedback when the console 520 performs an action.

The console 520 provides content to the headset 505 for presentation to the user in accordance with information received from the imaging device 510, the headset 505, or the I/O interface 515. In the example shown in FIG. 5, the console 520 includes an application store 570, a tracking module 575, and an engine 580. Some embodiments of the console 520 have different or additional modules than those described in conjunction with FIG. 5. Similarly, the functions further described below may be distributed among components of the console 520 in a different manner than is described here.

The application store 570 stores one or more applications for execution by the console 520. An application is a group of instructions, that when executed by a processor, generates content for presentation to the user. Content generated by an application may be in response to inputs received from the user via movement of the headset 505 or the I/O interface device 515. Examples of applications include gaming applications, conferencing applications, video playback application, or other suitable applications.

The tracking module 575 calibrates the system using one or more calibration parameters and may adjust one or more calibration parameters to reduce error in determining position of the headset 505. For example, the tracking module 575 adjusts the focus of the imaging device 510 to obtain a more accurate position for observed locators 550 on the headset 505. Moreover, calibration performed by the tracking module 575 also accounts for information received from the IMU 555. Additionally, if tracking of the headset 505 is lost (e.g., the imaging device 510 loses line of sight of at least a threshold number of locators 550), the tracking module 575 re-calibrates some or all of the system components.

Additionally, the tracking module 575 tracks the movement of the headset 505 using slow calibration information from the imaging device 510 and determines positions of a reference point on the headset 505 using observed locators from the slow calibration information and a model of the headset 505. The tracking module 575 also determines positions of the reference point on the headset 505 using position information from the fast calibration information from the IMU 555 on the headset 505. Additionally, the tracking module 575 may use portions of the fast calibration information, the slow calibration information, or some combination thereof, to predict a future location of the headset 505, which is provided to the engine 580.

The engine 580 executes applications within the system and receives position information, acceleration information, velocity information, predicted future positions, or some combination thereof for the headset 505 from the tracking module 575. Based on the received information, the engine 580 determines content to provide to the headset 505 for presentation to the user, such as a virtual scene. For example, if the received information indicates that the user has looked to the left, the engine 580 generates content for the headset 505 that optical elements or tracks the user's movement in a virtual environment. Additionally, the engine 580 performs an action within an application executing on the console 520 in response to an action request received from the I/O interface 515 and provides feedback to the user that the action was performed. The provided feedback may be visual or audible feedback via the headset 505 or haptic feedback via the I/O interface 515.

Figure 6:
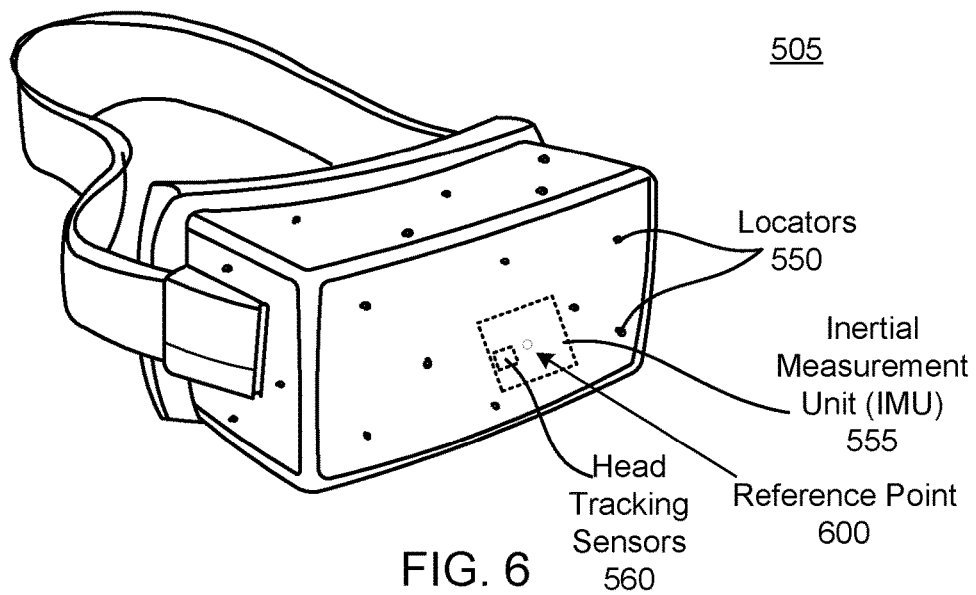
FIG. 6 shows an internal diagram of a HMD headset, in accordance with an embodiment.

FIG. 6 is a diagram of the headset 505, in accordance with at least one embodiment. In this example, the headset 505 includes a front rigid body and a band that goes around a user's head. The front rigid body includes one or more display screens corresponding to the electronic display 525, the IMU 555, the head tracking sensors 560, and the locators 550. In this example, the head tracking sensors 560 are located within the IMU 555.

The locators 550 are located in fixed positions on the front rigid body relative to one another and relative to a reference point 600. In this example, the reference point 600 is located at the center of the IMU 555. Each of the locators 550 emits light that is detectable by the imaging device 510. The locators 550, or portions of the locators 550, are located on a front side, a top side, a bottom side, a right side, and a left side of the front rigid body, as shown FIG. 6.

Focus Adjustment Method

Figure 7:
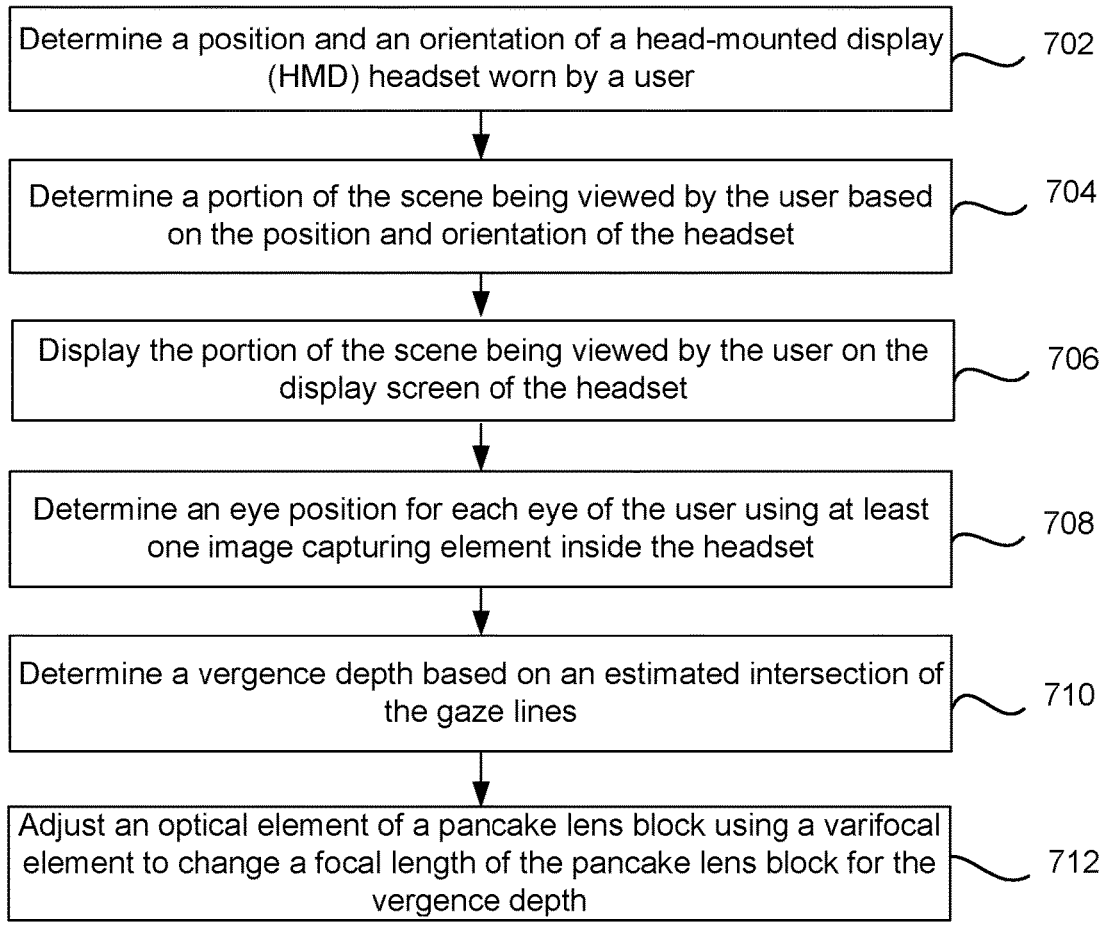
FIG. 7 shows an external diagram of a HMD headset, in accordance with an embodiment.

FIG. 7 shows an embodiment of a process 700 for mitigating vergence-accommodation conflict by adjusting the focal length of the pancake lens block 202 of the headset 505. As discussed above, a varifocal system may dynamically vary its focus to bring images presented to a user wearing the headset 505 into focus, which keeps the user's eyes in a zone of comfort as vergence and accommodation change. Additionally, eye tracking in combination with the variable focus of the varifocal system allows blurring to be introduced as depth cues in images presented by the headset 505. In one embodiment, the process of FIG. 7 is performed by the headset 505. Other entities (e.g., the console 520) may perform some or all of the steps of the process in other embodiments. Likewise, embodiments may include different and/or additional steps, or perform the steps in different orders.

Accordingly, in the embodiment shown by FIG. 7, a position, an orientation, and/or a movement of the headset 505 are determined 702 by a combination of the locators 550, the IMU 555, the head tracking sensors 560, the imaging device 510, and the tracking module 575, as described above in conjunction with FIG. 5. Portions of a scene presented by the headset 505 are mapped to various positions and orientations of the headset 505. Thus, a portion of the virtual scene currently viewed by a user is determined 704 based on the position, orientation, and movement of the headset 505.

The scene corresponding to the portion of the scene being viewed by the user is displayed 706 on the electronic display screen 525 with a distortion correction to correct optical error caused by the determined state of the pancake lens block 202 and with depth of field blur based on the filtered vergence depth. Further, the varifocal actuation block 530 has changed the focus of the pancake lens block 202 to provide focus and accommodation to the location in the portion of the scene where the user's eyes are verged. In various embodiments, the process 700 may include additional steps or perform steps in different orders than the order described in conjunction with FIG. 7.

Figure 8:
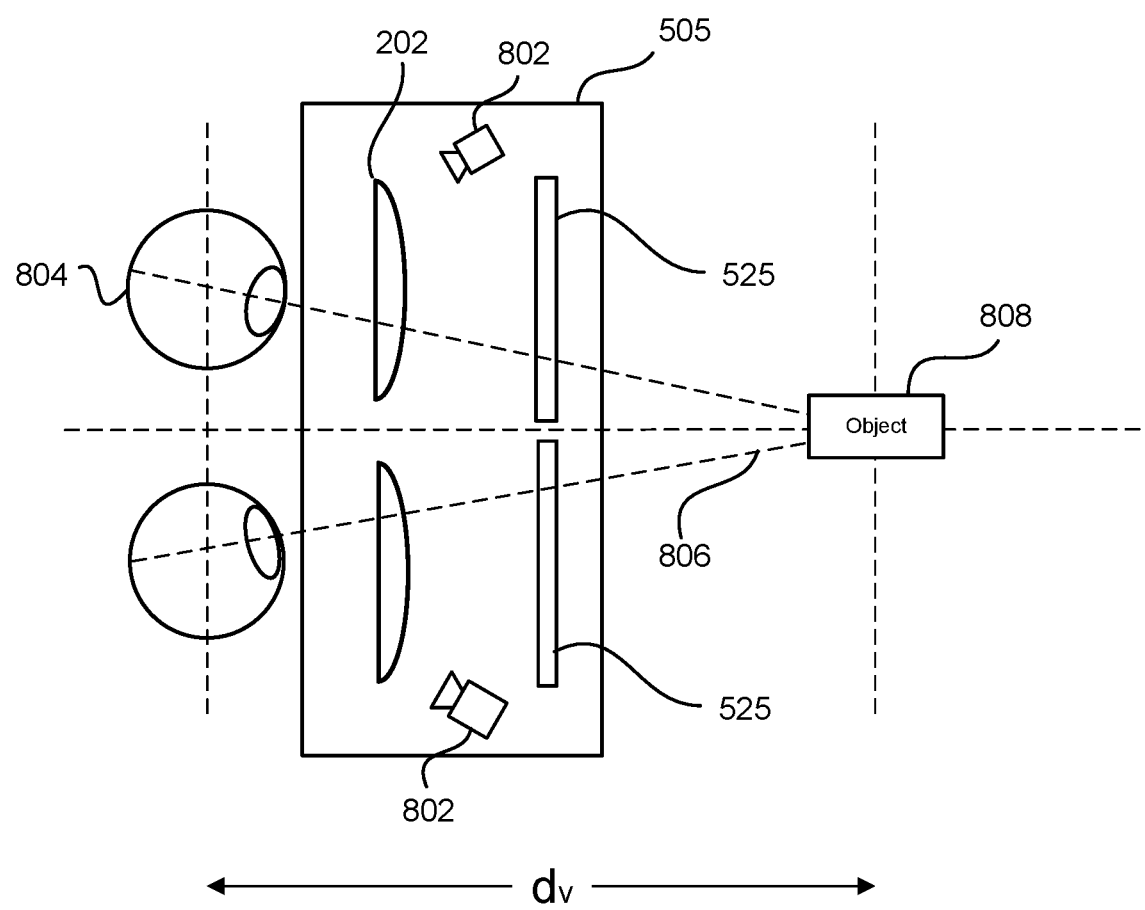
FIG. 8 shows an example process for mitigating vergence-accommodation conflict by adjusting the focal length of a pancake lens block that includes two optical elements, in accordance with an embodiment.

After determining 704 and displaying 706 the portion of the scene being viewed by the user, the system may then determine a location or an object within the determined portion at which the user is looking to adjust focus for that location or object accordingly. To determine the location or object within the determined portion of the virtual scene at which the user is looking, the headset 505 tracks the position and location of the user's eyes using image information from a camera or other image capturing element, for example. Thus, the headset 505 determines 708 an eye position for each eye of the user. For example, the headset 505 tracks at least a subset of the 3D position, roll, pitch, and yaw of each eye and uses these quantities to estimate a 3D gaze point of each eye. Further, information from past eye positions, information describing a position of the user's head, and information describing a scene presented to the user may also be used to estimate the 3D gaze point of an eye in various embodiments. For example, FIG. 8 shows a cross section of an embodiment of the headset 505 that includes camera 802 for tracking the position of each eye 804, the display screen 525, and the pancake lens block 202 that includes two optical elements, as described with respect to FIGS. 2A through 4. In this example, the camera 802 captures images of the user's eyes looking at an object 808 and the eye tracking module 540 determines an output for each eye 804 and gaze lines 806 corresponding to the gaze point or location where the user is looking based on the captured images. Accordingly, vergence depth ($d_v$) of the object 808 (also the user's gaze point) is determined 710 based on an estimated intersection of the gaze lines 806. As shown in FIG. 8, the gaze lines 806 converge or intersect at distance $d_v$, where the object 808 is located.

Accordingly, referring again to FIG. 7, one of the two optical elements of the pancake lens block 202 is adjusted 712 using a varifocal element of the varifocal actuation block 530. As described above, an optical element of the pancake lens block 202 is adjusted to change the focal length (or power) of the headset 505 to provide accommodation for the determined vergence depth corresponding to where or what in the displayed portion of the virtual scene the user is looking. In one embodiment, adjusting one of the two optical elements includes changing a distance between the back optical element 206 and the front optical element 204 from FIGS. 2A through 4, for example. In another embodiment, adjusting one of the two optical elements includes applying a force to the larger of the two optical elements. Alternatively, the shape of both optical elements can be changed simultaneously or a combination of changing at least one of the optical element's shape or changing the distance between the two optical elements is used change the focal length of the pancake lens block.

Accordingly, referring again to FIG. 7, one of the two optical elements of the pancake lens block 202 is adjusted 712 using a varifocal element of the varifocal actuation block 530. As described above, an optical element of the pancake lens block 202 is adjusted to change the focal length (or power) of the headset 505 to provide accommodation for the determined vergence depth corresponding to where or what in the displayed portion of the virtual scene the user is looking. In one embodiment, adjusting one of the two optical elements includes changing a distance between the back optical element 206 and the front optical element 204 from FIGS. 2A through 4, for example. In another embodiment, adjusting one of the two optical elements includes applying a force to the larger of the two optical elements. Alternatively, the shape of both optical elements can be changed simultaneously or a combination of changing at least one of the optical element's shape or changing the distance between the two optical elements is used change the focal length of the pancake lens block.

Turning now to a discussion of some additional embodiments. In some embodiments, a pancake lens block comprises: a first waveplate that changes a polarization of image light that is linearly polarized to nonlinearly polarized light, to form first nonlinearly polarized light; a Fresnel configured to transmit a portion of the first nonlinearly polarized light; a second waveplate that changes a polarization of the first nonlinearly polarized light to linear polarized light, to form first linearly polarized light; and a linear reflective polarizer that is configured to transmit linear polarized light of a particular orientation and reflect light of other orientations, and the first linearly polarized light has an orientation that is orthogonal to the particular orientation, wherein the first linearly polarized light is reflected back toward the second waveplate that changes the polarization of the portion of the image light to form second nonlinearly polarized light, and the second nonlinearly polarized light is transmitted to the Fresnel surface that reflects a portion of the second nonlinearly polarized light to form third nonlinearly polarized light that has a handedness that is opposite the second nonlinearly polarized light, the third nonlinearly polarized light is changed to fourth linear polarized light by the second waveplate, and the fourth linear polarized light has an orientation that matches the particular orientation and is transmitted by the linear reflective polarizer.

In some embodiments, the pancake lens is a single optical structure with a first side and a second side that is opposite the first side, and the Fresnel surface is part of the first side, and it is coupled to the first waveplate, and the second side is coupled to the second waveplate, and the second waveplate is coupled to the linear reflective polarizer.

In some embodiments, the Fresnel surface is overmolded with an immersion layer that is index matched to the Fresnel surface.

In some embodiments, the Fresnel surface includes a first set of facets and a second set of facets, and the first set of facets are coated with a coating that is reflective in a band of light, and the second set of facets are transmissive in the band of light.

In some embodiments, the pancake lens block further comprises an additional Fresnel surface that is placed between an eyebox and the linear reflective polarizer, wherein facets of the additional Fresnel surface receive light from the linear reflective polarizer.

In some embodiments, a distance between the Fresnel surface and a display screen meets a condition that a diameter of the image light projected on the Fresnel surface is larger than a pitch of the Fresnel surface.

In some embodiments, the nonlinearly polarized light is circularly polarized light.

In some embodiments, a pitch of the Fresnel surface is smaller than 0.2 mm.

In some embodiments, the Fresnel surface comprises lower pitch on a central portion of the Fresnel surface, and draft facets of the Fresnel surface are parallel to a chief ray.

In some embodiments, a head-mounted display (HMD), comprises: a pancake lens block configured to receive image light from an electronic display, and present the image light in an image plane, the pancake lens block comprising: a first waveplate that changes a polarization of the image light to nonlinearly polarized light, to form first nonlinearly polarized light; a Fresnel surface configured to transmit a portion of the first nonlinearly polarized light; a second waveplate that changes a polarization of the first nonlinearly polarized light to linear polarized light, to form first linearly polarized light; and a linear reflective polarizer that is configured to transmit linear polarized light of a particular orientation and reflect light of other orientations, and the first linearly polarized light has an orientation that is orthogonal to the particular orientation, wherein the first linearly polarized light is reflected back toward the second waveplate that changes the polarization of the portion of the image light to form second nonlinearly polarized light, and the second nonlinearly polarized light is transmitted to the Fresnel surface that reflects a portion of the second nonlinearly polarized light to form third nonlinearly polarized light that has a handedness that is opposite the second nonlinearly polarized light, the third nonlinearly polarized light is changed to fourth linear polarized light by the second waveplate, and the fourth linear polarized light has a polarization orientation that matches the particular orientation and is transmitted by the linear reflective polarizer.

In some embodiments the Fresnel surface and the first wave plate are part of a first optical element, and the second waveplate and the linear reflective polarizer are part of a second optical element, the HMD further comprising: a varifocal actuation block configured to adjust a distance between the first optical element and the electronic display to adjust a location of the image plane.

In some embodiments the Fresnel surface and the first wave plate are part of a first optical element, and the second waveplate and the linear reflective polarizer are part of a second optical element, the HMD further comprising: a varifocal actuation block configured to adjust a distance between the second optical element and the electronic display to adjust a location of the image plane.

In some embodiments, the Fresnel surface and the first waveplate are part of a first optical element, and the second wave late and the linear reflective polarizer are part of a second optical element, the HMD further comprising: a varifocal actuation block configured to apply a rotationally symmetric force to an edge of the first optical element, the rotationally symmetric force changing a focal length of the pancake lens block by changing a shape of the first optical element.

In some embodiments, wherein the pancake lens is a single optical structure with a first side and a second side that is opposite the first side, and the Fresnel surface is part of the first side, and it is coupled to the first waveplate, and the second side is coupled to the second waveplate, and the second waveplate is coupled to the linear reflective polarizer.

In some embodiments, wherein the Fresnel surface is overmolded with an immersion layer that is index matched to the Fresnel surface.

In some embodiments, wherein the Fresnel surface includes a first set of facets and a second set of facets, and the first set of facets are coated with a coating that is reflective in a band of light, and the second set of facets are transmissive in the band of light.

In some embodiments the HMD further comprises an additional Fresnel surface that is placed between an eyebox and the linear reflective polarizer, wherein facets of the additional Fresnel surface receive light from the linear reflective polarizer.

In some embodiments a distance between the Fresnel surface and a display screen meets a condition that a diameter of the image light projected on the Fresnel surface is larger than a pitch of the Fresnel surface.

In some embodiments the nonlinearly polarized light is circularly polarized light.

In some embodiments, wherein the Fresnel surface comprises lower pitch on a central portion of the Fresnel surface, and draft facets of the Fresnel surface are parallel to a chief ray.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A lens block implemented as a monolithic pancake lens block, the lens block comprising:
    a first waveplate surface positioned to receive light coming from a display;
    a front optical element having a first flat surface and a second flat surface opposite to the first flat surface, a second waveplate surface placed on the first flat surface and a reflective polarizer surface placed on the second flat surface; and
    a Fresnel lens comprising a first set of facets with a partially reflective coating that are reflective in a band of light and a second set of facets without the partially reflective coating that are transmissive in the band of light, the Fresnel lens configured to:
        partially transmit first light of a first polarization coming from the first waveplate surface in a first direction, and
        partially reflect second light of the first polarization coming from the second waveplate surface in a second direction opposite to the first direction, wherein
    the reflective polarizer surface is directly adjacent to an exit pupil and configured to transmit light of a second polarization coming from the second waveplate surface in the first direction, and the second waveplate surface is directly adjacent to the Fresnel lens.

2. The lens block of claim 1, wherein the first light is circularly polarized light.

3. The lens block of claim 1, wherein the second waveplate surface is configured to change a polarization of a portion of the first light coming from the Fresnel lens from a circular polarization into a linear polarization.

4. The lens block of claim 1, wherein the first waveplate surface is a quarter waveplate.

5. The lens block of claim 1, wherein the second waveplate surface is configured to change a polarization of a portion of light partially reflected in the first direction by the Fresnel lens into the second polarization.

6. The lens block of claim 1, wherein the reflective polarizer surface is a linear reflective polarizer.

7. The lens block of claim 1, wherein a surface of the Fresnel lens is overmolded with an immersion layer.

8. The lens block of claim 7, wherein the immersion layer is index matched to the surface of the Fresnel lens.

9. The lens block of claim 1, wherein the second waveplate surface has a matching retardance as the first waveplate surface and is rotated such that a slow axis of the first waveplate surface lines up with a fast axis of the second waveplate surface.

10. The lens block of claim 1, wherein at least some of a plurality of optical surfaces of the lens block have different indices of refraction, and the indices of refraction are such that the front optical element and a back optical element that includes the first waveplate surface and the Fresnel lens compensate each other to mitigate a field curvature of the lens block.

11. The lens block of claim 1, wherein the lens block is capable of being part of a headset.

12. A method comprising:
    receiving light coming from a display at a first waveplate surface in a lens block implemented as a monolithic pancake lens block;

partially transmitting, by a Fresnel lens in the lens block, first light of a first polarization coming from the first waveplate surface in a first direction, the Fresnel lens comprising a first set of facets with a partially reflective coating that are reflective in a band of light and a second set of facets without the partially reflective coating that are transmissive in the band of light;

partially reflecting, by the Fresnel lens, second light of the first polarization coming from a second waveplate surface of a front optical element in the lens block in a second direction opposite to the first direction, the front optical element having a first flat surface and a second flat surface opposite to the first flat surface, the second waveplate surface placed on the first flat surface and a reflective polarizer surface placed on the second flat surface;

changing, by the second waveplate surface, a polarization of a portion of the first light coming from the Fresnel lens from the first polarization into the second polarization; and transmitting, by the reflective polarizer surface that is directly adjacent to an exit pupil, light of the second polarization coming from the second waveplate surface in the first direction, and the second waveplate surface is directly adjacent to the Fresnel lens.

13. The method of claim 12, wherein the first light is circularly polarized light.

14. The method of claim 13, further comprising changing, by the second waveplate surface, the polarization of the portion of the first light from a circular polarization into a linear polarization.

15. A headset comprising:
a display configured to emit image light; and
a lens block implemented as a monolithic pancake lens block, the lens block comprising:
  a first waveplate surface positioned to receive the image light,
  a front optical element having a first flat surface and a second flat surface opposite to the first flat surface, a second waveplate surface placed on the first flat surface and a reflective polarizer surface placed on the second flat surface, and
  a Fresnel lens comprising a first set of facets with a partially reflective coating that are reflective in a band of light and a second set of facets without the partially reflective coating that are transmissive in the band of light, the Fresnel lens configured to:
    partially transmit the received image light of a first polarization coming from the first waveplate surface in a first direction, and
    partially reflect incident light of the first polarization coming from the second waveplate surface in a second direction opposite to the first direction, wherein
  the reflective polarizer surface is directly adjacent to an eye box of the headset and configured to transmit light of a second polarization coming from the second waveplate surface in the first direction toward the eye box, and the second waveplate surface is directly adjacent to the Fresnel lens.

\* \* \* \* \*